United States Patent
Hauser

(10) Patent No.: US 9,524,284 B2
(45) Date of Patent: Dec. 20, 2016

(54) SYSTEM, METHOD AND COMPUTER READABLE MEDIUM FOR RECORDING AUTHORING EVENTS WITH WEB PAGE CONTENT

(75) Inventor: Robert R. Hauser, Frisco, TX (US)

(73) Assignee: Suboti, LLC, Frisco, TX (US)

( * ) Notice: Subject to any disclaimer, the term of this patent is extended or adjusted under 35 U.S.C. 154(b) by 350 days.

(21) Appl. No.: 13/287,431

(22) Filed: Nov. 2, 2011

(65) Prior Publication Data
US 2012/0047426 A1    Feb. 23, 2012

Related U.S. Application Data

(63) Continuation of application No. 12/435,758, filed on May 5, 2009.

(51) Int. Cl.
| | |
|---|---|
| *G06F 17/00* | (2006.01) |
| *G06F 17/24* | (2006.01) |
| *G06F 21/55* | (2013.01) |
| *G06F 17/30* | (2006.01) |
| *G06F 17/22* | (2006.01) |

(Continued)

(52) U.S. Cl.
CPC .......... *G06F 17/243* (2013.01); *G06F 17/241* (2013.01); *G06F 21/55* (2013.01); *G06F 3/0481* (2013.01); *G06F 7/02* (2013.01); *G06F 17/2247* (2013.01); *G06F 17/3089* (2013.01); *G06F 17/30864* (2013.01); *G06F 17/30899* (2013.01);

(Continued)

(58) Field of Classification Search
CPC ...... G06F 17/24; G06F 17/241; G06F 17/247; G06F 17/2229; G06F 17/30896; G06F 2221/2133;G06F 17/2247; G06F 17/243; G06F 17/30864; G06F 17/3089; G06F 17/30899; G06F 21/55; G06F 3/0481; G06F 7/02; G06Q 10/107; G06Q 30/02; G06Q 30/06
USPC ........................... 715/202, 234, 255; 726/23
See application file for complete search history.

(56) References Cited

U.S. PATENT DOCUMENTS

| | | |
|---|---|---|
| 6,848,108 B1 | 1/2005 | Caron |
| 7,051,042 B2 | 5/2006 | Krishnaprasad et al. |

(Continued)

OTHER PUBLICATIONS

Ben Hunt, "Alternative to CAPTCHA—Protect WEb Forms from Spam with Javascript", Jan. 25, 2009, Ben Hunt's Web Design From Scratch, pp. 8.*

(Continued)

*Primary Examiner* — Chau Nguyen

(57) ABSTRACT

A web page that includes content form fields may be modified to include an event observer module and an authored content module. The authored content module adds a hidden "events observed" field to the form fields. Events generated during the authoring of content by a user are recorded by the event observer module. When the content is submitted from a client browser to the web server, the events generated during the authoring of the content are added to the events observed field and submitted with the content. The web server uses the events to determine a DOM of the web page and compare the observed DOM with a stored DOM for that web page and that particular interaction. The page structure may be optionally modified by the web server to enhance the analysis of the DOM comparison. The web server analysis facilitates detection of non-human content submission at a client browser.

16 Claims, 6 Drawing Sheets

(51) Int. Cl.

| | |
|---|---|
| *G06Q 30/02* | (2012.01) |
| *G06Q 10/10* | (2012.01) |
| *G06F 3/0481* | (2013.01) |
| *G06Q 30/06* | (2012.01) |
| *G06F 7/02* | (2006.01) |

(52) U.S. Cl.
CPC ... *G06F 2221/2133* (2013.01); *G06Q 10/107* (2013.01); *G06Q 30/02* (2013.01); *G06Q 30/06* (2013.01)

(56) References Cited

U.S. PATENT DOCUMENTS

| | | | | |
|---|---|---|---|---|
| 8,175,922 | B2* | 5/2012 | Jones et al. | 715/748 |
| 9,336,191 | B2* | 5/2016 | Hauser | G06F 17/241 |
| 2006/0155780 | A1* | 7/2006 | Sakairi et al. | 707/201 |
| 2008/0040473 | A1* | 2/2008 | Larsson et al. | 709/224 |
| 2008/0147456 | A1* | 6/2008 | Broder et al. | 705/7 |
| 2008/0162200 | A1* | 7/2008 | O'Sullivan et al. | 705/7 |
| 2008/0301808 | A1* | 12/2008 | Calo et al. | 726/23 |
| 2009/0063500 | A1* | 3/2009 | Zhai | G06F 17/30911 |
| 2009/0319355 | A1* | 12/2009 | Sinyagin et al. | 705/14.25 |
| 2010/0262457 | A1* | 10/2010 | House | 705/10 |

OTHER PUBLICATIONS

Greasemonkey Hacks, "Hack #6: Add or Remove Content on a Page", Aug. 8, 2007, Safaribookonline.com, pp. 5.*
Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

* cited by examiner

US 9,524,284 B2

SYSTEM, METHOD AND COMPUTER READABLE MEDIUM FOR RECORDING AUTHORING EVENTS WITH WEB PAGE CONTENT

CROSS-REFERENCE TO RELATED APPLICATIONS

This application is a continuation of and claims priority from U.S. patent application Ser. No. 12/435,758 filed on May 5, 2009, entitled SYSTEM, METHOD AND COMPUTER READABLE MEDIUM FOR RECORDING AUTHORING EVENTS WITH WEB PAGE CONTENT; this application is incorporated herein by reference in its' entirety.

FIELD OF THE INVENTION

This invention relates to a system, method and computer readable medium for providing and processing user content generated in web pages.

BACKGROUND OF THE INVENTION

In many web based applications, it may be necessary to verify that a human is using a computer, rather than an automated computer program, as one example. One well known solution for use with web based forms, is to use an application such as CAPTCHA (Completely Automated Public Turing test to tell Computers and Humans Apart). A CAPTCHA is a type of challenge-response test presented on screen to determine if the user is a human. A problem with using CAPTCHAs is that they can be automatically solved by computer algorithms. Further, humans can be used to solve CAPTCHAs the first time, with the response being recorded with the original challenge so if the same challenge is reused later a computer program can respond without assistance from a human. CAPTCHAs can be annoying to users and can typically only be used at predetermined locations within an application (e.g. a web form during user logon).

An alternative solution, often used in video games is to insert random events. Random events interrupt some otherwise predictable order of events by presenting new activities to the player/user. These are usually used to discourage players from using automated means to artificially gain experience within a gaming environment. Random events are annoying to users/players unless well crafted within the web page/game. Random events do not occur at predetermined locations but may require ongoing background analysis to estimate when a user/player may be using automated means of control.

An alternative system and method for determining whether web page interactions are human or non-human is described in the Applicant's co-pending U.S. patent application Ser. No. 12/435,740, the contents of which are herein incorporated by cross reference. In the Applicant's solution, event streams generated at the client device are analyzed by a server, such as the web server or a classification server, in order to determine whether the event streams that have been generated match known human or non-human derived event streams. As event stream processing becomes more and more commonplace, it is inevitable that computer programs will be created that attempt to generate human-like event streams.

What is required is a system, method and computer readable medium for recording entry of content into a web page that facilitates detection of a non-human presence at a client browser.

SUMMARY OF THE INVENTION

In one aspect of the disclosure, there is provided a method for recording web page content into a web page comprising at least one user entry element. The method comprises receiving content into the at least one user entry element, recording one or more events that occurred during entry of the content, and submitting the content and the one or more events to a web server.

In one aspect of the disclosure, there is provided a web server configured to:

generate a web page and provide the web page to a client browser. The web page comprises at least one user entry element, an event observer module that records events generated when content is added to the at least one user entry element, and an authored content module that writes the recorded events into a hidden events field associated with the at least one user entry element.

In one aspect of the disclosure, there is provided a computer-readable medium comprising computer-executable instructions for execution by a processor, that, when executed, cause the processor to receive a content submission from a web browser comprising content of a user entry element of a web page, and one or more events generated in the web browser during authoring of the content. The processor is further caused to determine a document object model of the web page from the events, and compare the determined document object model with a stored document object model for the web page.

BRIEF DESCRIPTION OF THE DRAWINGS

The invention will now be described, by way of example only, with reference to specific embodiments and to the accompanying drawings in which.

DETAILED DESCRIPTION OF THE INVENTION

In the Applicant's co-pending U.S. patent application Ser. No. 12/435,754, the contents of which are incorporated herein by reference, there was described a system for binding authored content from a web page with the events that were generated during the creation of the authored content. In that system, an authored content module was provided within a web page and used to modify form fields and similar user entry elements of a web page to include hidden data fields. An event observer module recorded the events such as mouse clicks, mouse moves, key strokes etc that were generated when a user entered content to the form fields. When the content was submitted from a client browser to a web server, the authored content module updated the hidden field with an interaction identifier provided by the event observer module. The authored content and the event stream were thus commonly identified by the interaction identifier, enabling the authored content and the event stream to be later associated, such as at the web server or some offsite server.

Figure 1:
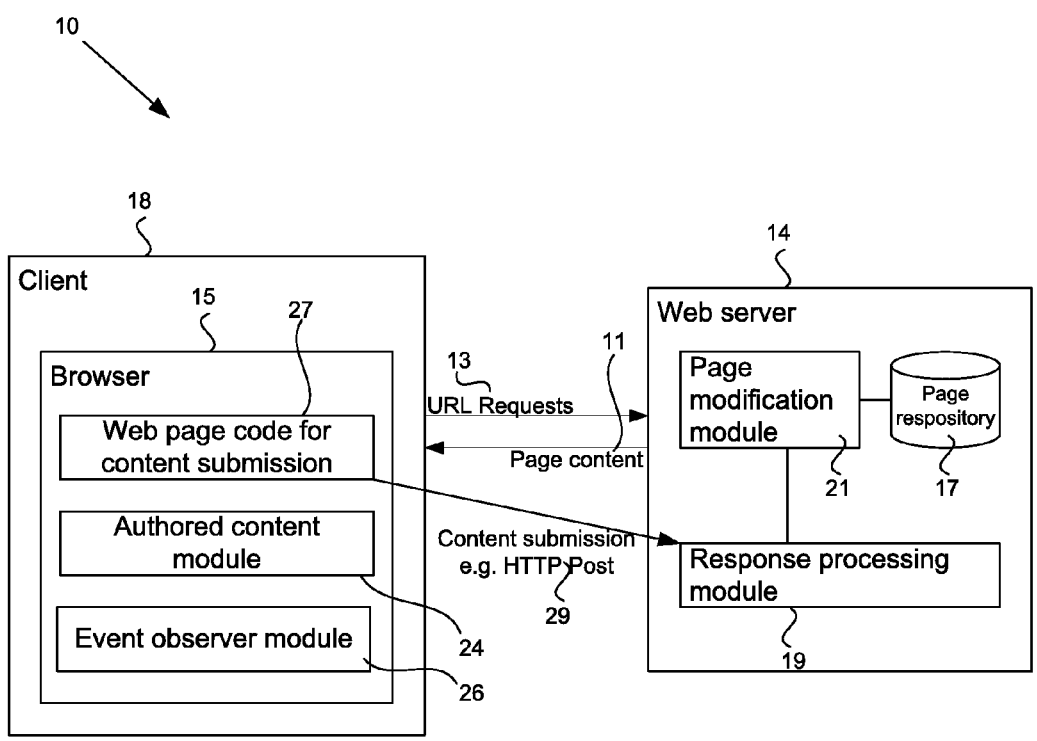
FIG. 1 illustrates a system for providing a web page and recording web page content.

A system 10 in accordance with the present disclosure is illustrated in FIG. 1. In the system 10, a client 18 provides web page requests 13 to a web server 14, in response to which, the web server 14 provides page content 11 for display in a browser 15 of the client 18. Typically, the web page 11 will include visible content and may include code 27 for content submission to the web server 14 via user entry elements such as an HTML form element. Many alternative user entry elements and content submissions methods will be known to a person skilled in the art. For example, AJAX methods may be used in place of the form elements. However, the specific content submission technique is considered irrelevant for the purposes of the present disclosure and all appropriate user entry elements and content submission methods are considered to be equivalent and are intended to be encompassed herein.

The web server 14 may include a page repository 17 from which the web server 14 retrieves page content for generating the web pages 11 in response to page requests from the client 18. In one embodiment, the page that the web server 14 gets from the page repository 17, which may be a simple file system or a more complex repository, may optionally undergo a structural change by a page modification module 21, The page modification module 21 may insert or delete elements to change the structure of the page without changing the behavior and without changing, or minimally changing, the viewport rendering of the page. In one embodiment, the structural change may simply be an insertion of attributes to existing elements, which does not actually change the Document Object Model (DOM) structure.

Figure 2:
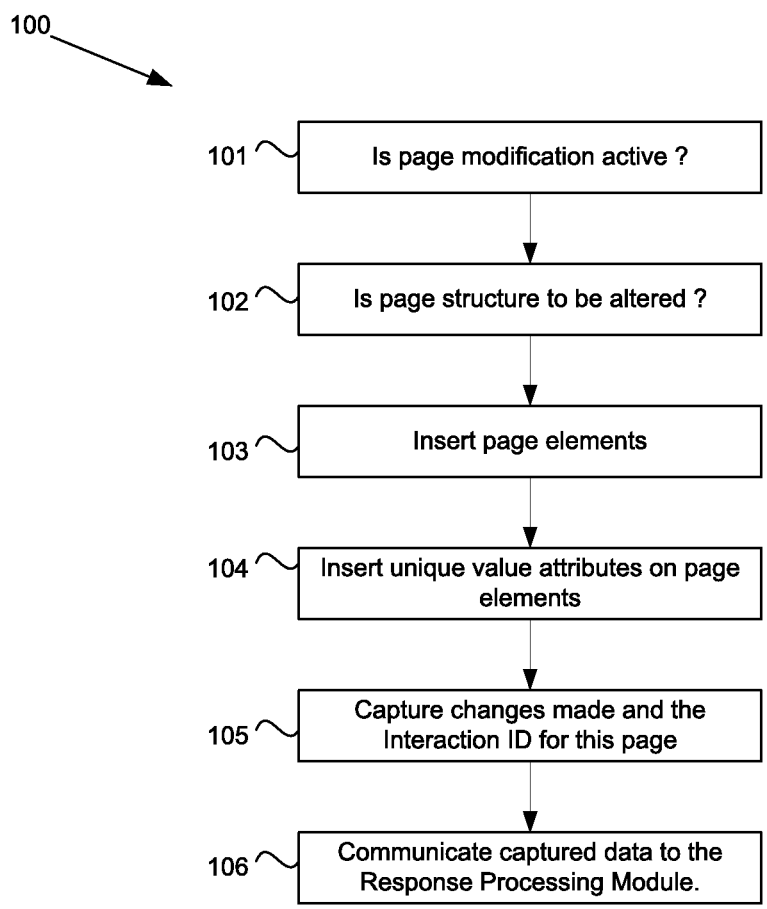
FIG. 2 illustrates a method for modifying a web page structure.

A process 100 for page modification by the page modification module 21 will be described with reference to FIG. 2. At step 101, the web server 14, having received a page request from the client 18, determines whether page modification is active. In one embodiment, the web page may be altered on each delivery instance in order to prevent replay attacks (e.g. replaying a previously recorded human generated event stream). If active, the web server 14 then determines whether the page structure is to be altered (step 102), in which case, the web server retrieves the page from the page repository 17 and inserts, or possibly deletes, one or more page elements (step 103). One example of a page structure change would add an extra element. If the original web page had the following elements, <span id="span1"> <input name="field1" id="field1"/> </span>, then a modified page may have inserted a <div> element as follows, <div id="div8328"> <span id="span1"> <input name="field1" id="field1"/> </span> </div>. If the original page has been constructed with extra <div>, <span>, or other elements then another suitable page structure change would remove one of the extra elements. The page elements are typically added in a way that does not significantly alter the display of the web page, and are provided non-reversibly, e.g. randomly, for this particular page request. At step 104, unique value attributes are inserted into the page elements, e.g. the attribute id="div8328" in the example above. In one embodiment, the value attributes may be randomly generated or they may be derived from other available parameters. At step 105, the changes made to the page structure, including the values added, are captured and associated with an InteractionID for the particular page request. At step 106, the captured changes and data are provided to the Response Processing Module for storing in a locally accessible data store in association with the InteractionID.

As described in the Applicant's co-pending U.S. patent application Ser. No. 12/435,754 referenced above, an authored content module 24 and event observer module 26 are generated as part of the web page 11. The event observer module 26 observes events generated in a user interaction with the web page 27 at the client 18. The event observer module 26 records events generated within the web browser 15, such as mouse clicks, mouse moves, text entries etc. However, in the present disclosure, the function of the event observer module is modified such that the event information is stored locally until all the information of the form is submitted to the web server 14.

The authored content module 24 processes the web page content and adds hidden form fields so that when user content is created, the events generated during the content creation can be associated with the content in a process to be described in greater detail below. In one embodiment, the authored content module 24 adds a hidden "events observed" field to each user entry element of the web page 27.

Figure 3:
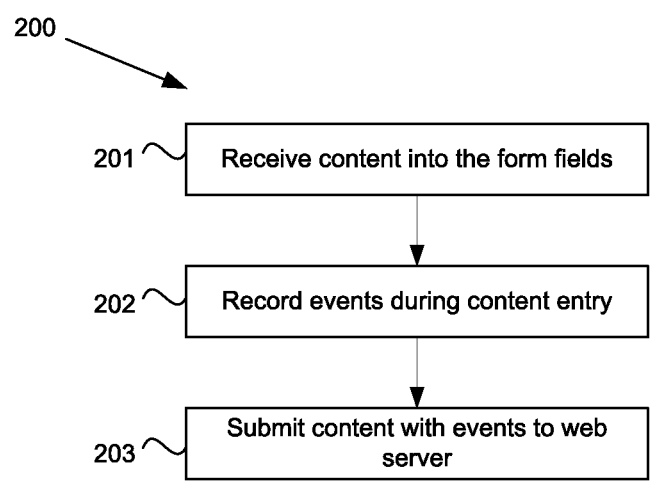
FIG. 3 illustrates a method for recording web page content.

During an interaction with the web page 11, a user enters content where appropriate, such as in the HTML form elements described above. During content creation, various events are generated and recorded by the event observer module 26. Events may include mouse clicks, mouse moves, key strokes etc. At some stage during the user interaction, the client will submit content 29, e.g. via an HTML form element field, to the web server 14. When the content is submitted, the hidden form fields, such as the "events observed" field, may be dynamically updated with recorded events from the event observer module 26. Thus the content submission carries additional elements. The content submission process is illustrated in the flowchart 200 of FIG. 3. At step 201, the user enters content into the user entry elements, i.e. form fields, of the web page. During the entry of the content, one or more events are recorded by the event observer module (202). At step 203, the content and the events are submitted to the web server 14.

Figure 4:
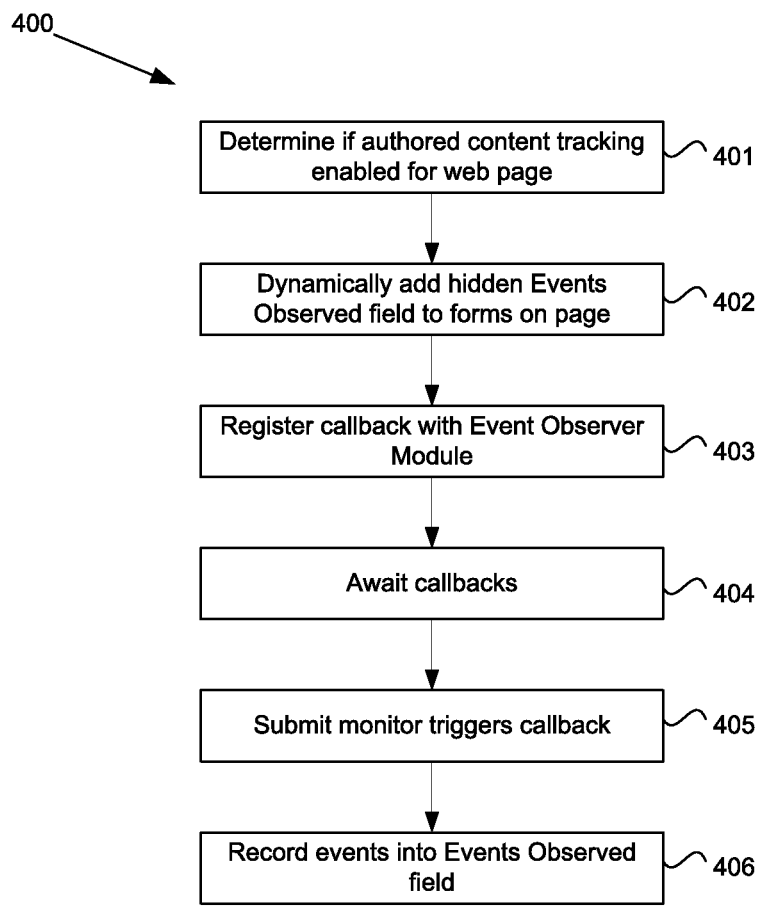
FIG. 4 illustrates a process of an authored content module.

The operation of the authored content module 24 will now be described with reference to the flowchart 400 of FIG. 4. The authored content module 24 is provided within the web page content 11 in a manner that is invisible to the user. When a user interfaces with a web page 11, in a first step 401, the authored content module 24 determines whether authored content tracking is enabled for that web page. If enabled, the authored content module 24 then dynamically adds hidden input elements, such as "events observed" field to forms or other user content areas on the page (step 402) as will be described in greater detail below. The authored content module 24 then registers callback with the event observer module 26 (step 403). At this stage, the authored content module is set to awaiting callbacks (step 404). The event observer module 26 observes events generated in a user interaction with the web page 27 at the client 18. The event observer module 26 records events generated within the web browser 15, such as mouse clicks, mouse moves, text entries etc. When a user submits the content 29 to the web server 14, a callback to the authored content module 24 is triggered, (step 405). The authored content module 24 then updates the events observed component of each user entry field (step 406) prior to submission of the web page content 29 to the web server 14.

In accordance with an embodiment of the invention, the authored content module 24 can use the function below to add a hidden input field that will be updated dynamically. The example function discovers the form by id but forms can also be discovered by traversing the structure of the Document Object Model (DOM).

```
function insertformtracker( ) {
    // Insert a hidden form element to send observed events
    // to the web-server.
    var x = document.getElementById('commentform');
    if (!!x) {
        var y = document.createElement('input');
        y.type = "hidden";
        y.name = "EventsObserved";
        // y.value will be updated live to be the events
        // seen by the event observer module during
        // content entry into this form
        y.value = "none";
        x.appendChild(y);
    };
};
```

For example, a web page may contain code for a page element "field1" as follows:

```
<span id="span1">
    <input name="field1" id="field1">
</span>
```

The "insert form tracker" function locates form containing the "field1" field and registers the "EventsObserved" field as a hidden field. A user may enter "sometext" in field1. The content may be submitted to the web server as follows:
field1=sometext&EventsObserved= mousemove.span1.x.120.y.310

That is, the observed event data includes the event "mousemove.span1.x.120.y.310" which is submitted with the field1 content "sometext". The field content and hidden field data are submitted to the web server 14 where they are associated with the Interaction ID described above.

In a further example, the web page containing the "field1" field described above may be modified by the process described with reference to FIG. 2. In such an example, the modification may be provided as follows:

```
<div id="div8328">
    <span id="span1">
        <input name="field1" id="field1">
    </span>
</div>
```

Following the previous example, when the user enters the same "sometext" content into field 1, the content submission may appear as follows:
field1=sometext&EventsObserved= mousemove.span1.div8328.x120.y.310

That is, with event handlers registered for both span1 and div8328, and with the mousemove event (at x=120, y=310) seen by each event handler, each event handler will record an identifier for its DOM element into the data stream.

It can be seen that the content submission carries extra information added dynamically by the authored content module 24. The extra information includes the observed user interface events and the DOM element that each event was observed on (or some sample or subset of such). Because the events indicate the DOM element that each event was observed on, the events can be analyzed to infer the structure of the DOM. The page modification process described above allows the web server to alter the page structure by the creation of additional, usually non-visible, page elements and values. Page modification is useful in detecting malicious clients and preventing replay attacks. While a single mouse move event is shown, a person skilled in the art will readily understand that multiple events may be recorded and provided in the content submission. Additionally, an "events observed" field may be provided for each field in a form element. The data gathered in the "events observed" fields may be suitably encoded and, as mentioned, may be a sample or subset of the observed events. When down sampling of events is used, the function performing the down sampling may be generated uniquely per page request by the Page Modification Module.

Figure 5:
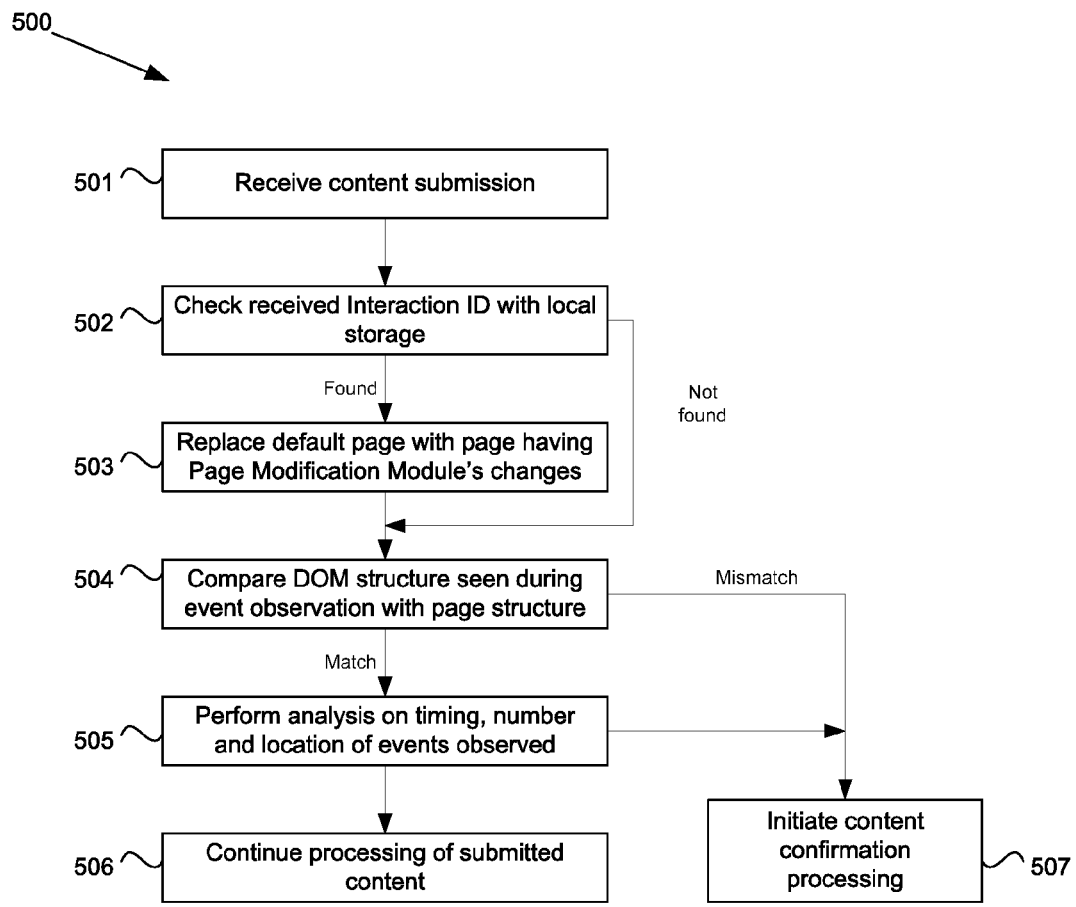
FIG. 5 illustrates a method for processing a content submission.

In FIG. 5 there is shown a process undertaken by the response processing module 19 of the web server 14. At step 501, the content submission is received. At step 502, the interaction ID associated with the content submission is checked against the local data store. A matching Interaction ID indicates that the page content was altered by the page modification module 21 in the modification process described above with reference to FIG. 2. Thus, at step 503, the response processing module replaces the default page with an altered page matching the page modification module's 21 changes. The DOM structure may be partially or fully included in the data sent in the "EventsObserved" field. In the previous example, the structure of the DOM page near field1 is indicated in the data along with the UI event "mousemove" that was observed: field1= sometext&EventsObserved=mousemove.span1. div8328.x120.y.310. The event handlers on the elements with ids "span1" and "div8328" added these attribute values into the EventsObserved field. The response processing module has a record of the page (as modified) and its DOM structure is compared (step 504) with the structure indicated by the data inserted during event capturing which arrived with the content submission. Any attribute values inserted during page modification can also be compared at this stage. In the example, "div8328" may include a random number, 8328, that was added by the page modification module for a particular interaction. A mismatch in the DOM structure and/or attribute values may be indicative of a non-human user at the client computer 18, such as an automated machine invoking an automated content submission perhaps using a previously recorded human web page interaction (a replay attack). For example, a malicious client may have replaced some or all of the web page content, thereby affecting either the DOM structure or the additional attribute values. Thus, the content submission may be ignored, tagged as spam or a content confirmation process 507 can be initiated. The content confirmation process may include providing a dynamic CAPTCHA to the client 18, as described in the Applicant's co-pending application, the contents of which are explicitly incorporated herein by reference.

If the DOM structure comparison indicates a match, then event analysis may be optionally performed (step 506) to determine the likely event generator type, e.g. human, non-human etc. Further detail of event generator analysis is described in the Applicant's co-pending U.S. patent application Ser. No. 12/435,740 referenced above. Alternatively or in addition, the events may be analyzed to correlate the number, timing and type of events with the actual content generated to determine if the content is most likely human generated, as described in the Applicant's co-pending U.S. patent application Ser. No. 12/435,754 referenced above. If the event analysis indicates a likely non-human user, then the content confirmation process 507 may be initiated. Otherwise, if the content submission is shown to be most likely human generated, then further processing of the content submission may follow.

In one embodiment, further processing of the content submission may include binding of the content, e.g. "sometext", to the underlying events involved in the generation of the content. The bind operation may be initiated from the web server 14 in response to the web server 14 receiving the content submission 29. In one embodiment, described in more detail in the Applicant's co-pending U.S. patent application Ser. No. 12/435,754 referenced above, a bind code may be created as a one-way hash of the concatenation of the hash of the content and/or the hash of the events generated in creating the content. The bind code may be associated with the content by a content ID field, by the interaction ID, or by some other suitable identifier. The binding operation may occur within the web server 14 or may be provided by a third party server (not shown) in response to a bind request from the web server 14. The binding of the events to the content allows additional services, such as the determination of various work metrics to be performed, as described in greater detail in the Applicant's co-pending U.S. patent application Ser. No. 12/435,754 referenced above.

In the above described embodiments, the page modification may be provided as a way to change the event stream signature. This provides resistance to automated attacks on providing fake (or automated) event stream data. In the present embodiments, the web server has control over the whole web page and, properly configured, it can change the structure of the web page, on each request if required.

The event observer module 26 and the authored content module 24 may be provided as code embedded in a web page 11 from the web server 14. Alternatively or in addition, the Event Observer Module 26 and the Authored Content Module 24 may be provided as a link back to the web server 14 or a third party server for the resource containing the code which the web browser will fetch as part of loading the web page.

Figure 6:
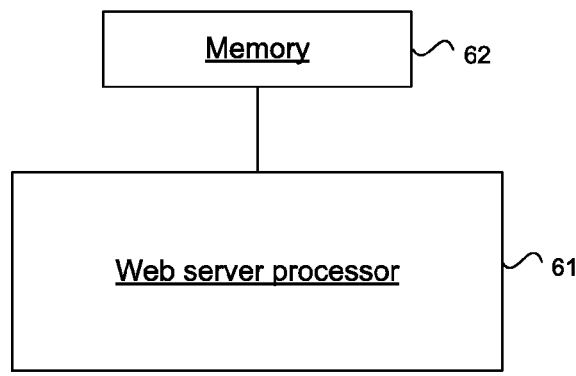
FIG. 6 illustrates a processor and memory of an web server.
Figure 7:
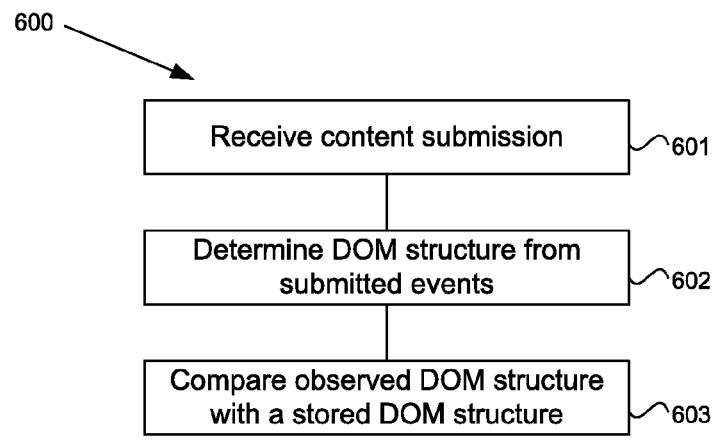
FIG. 7 illustrates an instruction set that may be executed on the processor and memory of FIG. 6.
Figure 8:
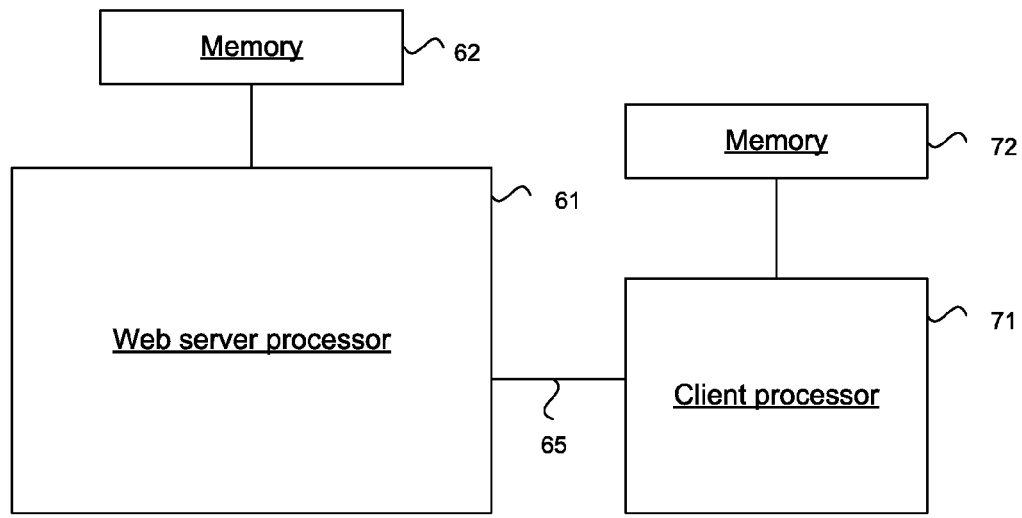
FIG. 8 illustrates the processor and memory of FIG. 9 in association with a processor and memory of a client browser.

In one embodiment, the web server 12 may include a processor 61 operatively associated with a memory 62 as shown in FIG. 6. The memory 62 may store instructions that are executable on the processor 61. In addition, the memory 62 may provide elements of the data store for the response processing module 19. An instruction set 600 that may be executed on the event server processor 61 is depicted in the flowchart of FIG. 7. Specifically, when executed, the instruction set 600 allows the processor to receive a content submission from the client browser 601. The content submission may include the content entered by the user and the events generated during the authoring of the content. The processor may then determine a DOM structure of the web page from the events that have been supplied 602 and compare the observed DOM structure with a stored DOM structure for the particular web page interaction, identified by the Interaction ID (step 603). The content submission may be received from a second processor, such as a processor 71 of the client browser shown in FIG. 8, that may also be operatively associated with a memory 72. The second processor 71 may provide the content submission through a suitable communications link 65.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of modifying a web page structure, the method comprising:
   receiving a web page request at at least one web server from a user;
   retrieving a default web page from a memory, wherein the memory is at least one of: located within the at least one web server or located apart from the at least one web server;
   modifying the default web page, at the at least one web server, by adding or deleting to the web page at least one document object model element responsive to receiving the web page request if a current web page modification capability function is active, wherein the added or deleted at least one document object model element does not alter the display of the webpage;
   transmitting, at the at least one web server, the modified web page to the user; and
   associating, at the at least one web server, the adding or deleting of the at least one document object model element with a user interaction identifier (ID) unique to the received web page request, wherein the associating occurs either before the transmitting or after the transmitting;
   wherein adding or deleting the at least one document object model element further comprises deleting at least one document object model element if the default web page includes an extra document object model element when it is retrieved from the memory;
   wherein adding or deleting the at least one document object model element further comprises adding at least one document object model element if the default web page does not include an extra document object model element when it is retrieved from the memory.

2. The method of claim 1, wherein the default web page is modified prior to each subsequent delivery instance.

3. The method of claim 1, wherein the modifying occurs if the default web page requires modification.

4. The method of claim 1, wherein the web page modification is performed automatically, and the adding or deleting operation is based on a random modification procedure that performs at least one of adds a random information element to the default web page and deletes a random information element from the default web page.

5. The method of claim 1, further comprising storing the associated data in the memory.

6. A method of processing user submitted data, the method comprising:
receiving a content data submission, at at least one web server, submitted by a user of a web page including a user interaction identifier (ID);
determining, at the at least one web server, whether the content data submission is in respect of modified web page content provided to the user using a web page modification procedure on a default web page content to produce the modified web page content by adding or deleting at least one document object model element to the web page content, wherein the added or deleted at least one document object model element does not alter the display of the webpage, wherein the determining is based on the user interaction ID and content of a web page record stored in a data store, wherein the content of the web page record indicates page modifications configured to produce the modified web page content, wherein the data store is at least one of: located within the at least one web server or located apart from the at least one web server;
when it is determined that the modified web page content was provided to the user, using the modified web page content in processing of the content data submission;
wherein adding or deleting the at least one document object model element further comprises deleting at least one document object model element if the default web page includes an extra document object model element when it is retrieved from the memory;
wherein adding or deleting the at least one document object model element further comprises adding at least one document object model element if the default web page does not include an extra document object model element when it is retrieved from the memory.

7. The method of claim 6, wherein the default web page is replaced with the modified web page content if the previously performed modification procedure was found in the web page record stored in the data store.

8. The method of claim 6, further comprising:
comparing, at the at least one web server, the modified web page content with the received content data submission from the user to identify data inserted into the content data submission during at least one data capture event conducted during a user interaction with the web page; and
determining whether the data inserted into the content data submission during the at least one data capture event is indicative of a human user based on the comparing operation.

9. The method of claim 8, wherein the data inserted into the content submission during the at least one data capture event comprises at least one of a peripheral computer mouse movement, at least a part of a document object model of the web page, a random number previously generated and inserted into the modified web page content and a hash of the random number.

10. The method of claim 8, wherein a mismatch between the data inserted into the content data submission during the at least one data capture event and the modified web page content indicates a non-human initiated content data submission.

11. The method of claim 10, further comprising:
performing at least one of:
ignoring the non-human indicated content data submission;
tagging the non-human indicated content data submission as spam; and
invoking an additional content confirmation procedure to determine whether the content data submission was a non-human initiated content data submission.

12. A non-transitory computer readable storage medium configured to store instructions that when executed cause a processor to perform modifying a web page structure, the processor being further configured to perform:
receiving a web page request at at least one web server from a user;
retrieving a default web page from a memory, wherein the memory is at least one of: located within the at least one web server or located apart from the at least one web server;
modifying the default web page, at the at least one web server, by adding or deleting at least one document object model element responsive to receiving the web page request if a current web page modification capability function is active, wherein the added or deleted at least one document object model element does not alter the display of the webpage;
transmitting, at the at least one web server, the modified web page to the user; and
associating, at the at least one web server, the adding or deleting of the at least one document object model element with a user interaction identifier (ID) unique to the received web page request, wherein the associating occurs either before the transmitting or after the transmitting;
wherein adding or deleting the at least one document object model element further comprises deleting at least one document object model element if the default web page includes an extra document object model element when it is retrieved from the memory;
wherein adding or deleting the at least one document object model element further comprises adding at least one document Object model element if the default web page does not include an extra document object model element when it is retrieved from the memory.

13. The non-transitory computer readable storage medium of claim 12, wherein the default web page is modified prior to each subsequent delivery instance.

14. The non-transitory computer readable storage medium of claim 12, wherein the modifying occurs if the default web page requires modification.

15. The non-transitory computer readable storage medium of claim 12, wherein the web page modification is performed automatically, and the adding or deleting operation is based on a random modification procedure that performs at least one of adds a random information element to the default web page and deletes a random information element from the default web page.

16. The non-transitory computer readable storage medium of claim 12, wherein the processor is further configured to perform:
storing the associated data in the memory.

* * * * *